Nov. 25, 1941.　　　P. J. McCULLOUGH　　　2,264,093
ELECTRIC TOASTER
Filed May 27, 1939　　　3 Sheets-Sheet 1

INVENTOR
PAUL J. McCULLOUGH
BY Rodney Bedell
ATTORNEY

Nov. 25, 1941.   P. J. McCULLOUGH   2,264,093
ELECTRIC TOASTER
Filed May 27, 1939   3 Sheets-Sheet 2

INVENTOR
PAUL J. McCULLOUGH
BY Rodney Bedell
ATTORNEY

Nov. 25, 1941.  P. J. McCULLOUGH  2,264,093
ELECTRIC TOASTER
Filed May 27, 1939  3 Sheets—Sheet 3

INVENTOR
PAUL J. McCULLOUGH
BY Rodney Bedell
ATTORNEY

Patented Nov. 25, 1941

2,264,093

UNITED STATES PATENT OFFICE 2,264,093

ELECTRIC TOASTER

Paul J. McCullough, St. Louis, Mo., assignor to Joseph Pavelka, St. Louis, Mo.

Application May 27, 1939, Serial No. 276,036

22 Claims. (Cl. 219—19)

The invention relates to electric heating devices such as bread toasters, although various features of the invention may be used in sandwich grills, waffle irons and other cookers. The bread toaster illustrated in the drawings as embodying the invention, includes the structure illustrated, described and claimed in my earlier filed application Serial No. 208,782 filed May 19, 1938, of which this is a continuation in part. The present application also includes some features in addition to the disclosures in my earlier application.

Such a toaster usually comprises a heating chamber and a basket or carrier therein for the bread slice, which carrier may be raised and lowered when bread is to be inserted in the device or toast is to be removed therefrom. One object of the present invention is to facilitate the manual manipulation of such a carrier.

Preferably such a toaster includes means automatically determining the toasting period and another object of the invention is to accommodate the manual lifting of the toast for visual inspection at any time during the toasting operation without interfering with the control mechanism.

Another object of the invention is to retain the carrier in elevated position automatically when once so raised so that only one hand is necessary to remove the toast.

Another object of the invention is to effect a visual indication of the completion of the toasting operation by automatically projecting the edge of the toast slightly beyond the housing while retaining the remainder of the toast within the housing to keep it hot, at the same time providing for the manual elevation, when desired, of a substantial portion of the slice of toast above the housing so it may be removed readily. Another object of the invention is to control the toast projecting mechanism so that the amount of the toast projected automatically may be varied as desired by the user.

Another object of the invention is to secure the production of fairly even results from successive heating operations irrespective of variation in the initial temperature of the cooker, and to accomplish this by varying the duration of the heating period in accordance with the temperature in the heating chamber but without changing the successive manual settings of the timing mechanism.

Another object of the invention is to provide for production of toast of different degrees of crispness, as desired, by limiting the manual movement of the setting mechanism independently of the mechanism for obtaining constant results as referred to above.

The toaster is provided with a timing mechanism including a spring-driven clockwork device which is set and operates through elements in frictional engagement with each other. Sometimes sets of the clockwork device and other elements of the toaster will vary so that the relation between the operating spring and the other parts is not uniform, and it is a further object of the invention to provide for the ready coordination of the spring and other parts of the mechanism to the end that the completed product may be uniform in operation.

Similar toasters utilizing high and low heat circuits have included switches having a plurality of switch terminals selectively engaged when the machine is changed from high to low heat or vice versa. Another object of the invention is to eliminate these switches and a substantial quantity of wiring required for the same.

These and other detail objects of the invention as will appear from the following description are attained by the structure illustrated in the accompanying drawings in which—

Figure 12:
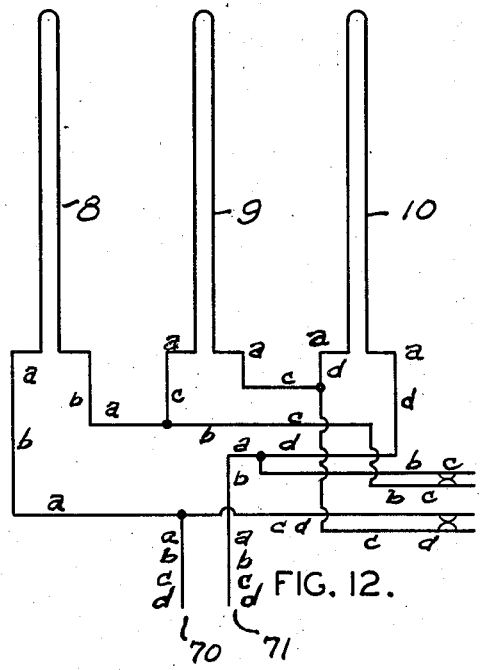
Figure 12 is a wiring diagram for the heater circuit.

The toaster casing includes a bottom wall 1, end walls 2 and 3, side walls 4 and 5 and a top wall 6. A horizontal partition plate 7 divides the casing into an upper heating chamber H and a lower mechanism chamber M. Three heating elements 8, 9 and 10 of familiar type are disposed vertically and longitudinally of the heating chamber and are indicated diagrammatically in Figure 12. The bread carrier has an upright end plate 11 spaced a short distance inwardly from end wall 2 and has bread supporting arms 12 extending longitudinally of the heating chamber between the middle heating element 9 and the side heating elements 8 and 10 respectively. Plate 11 has outturned flanges 13 at top and bottom perforated to slide on stationary guide rods 14.

Figure 8:
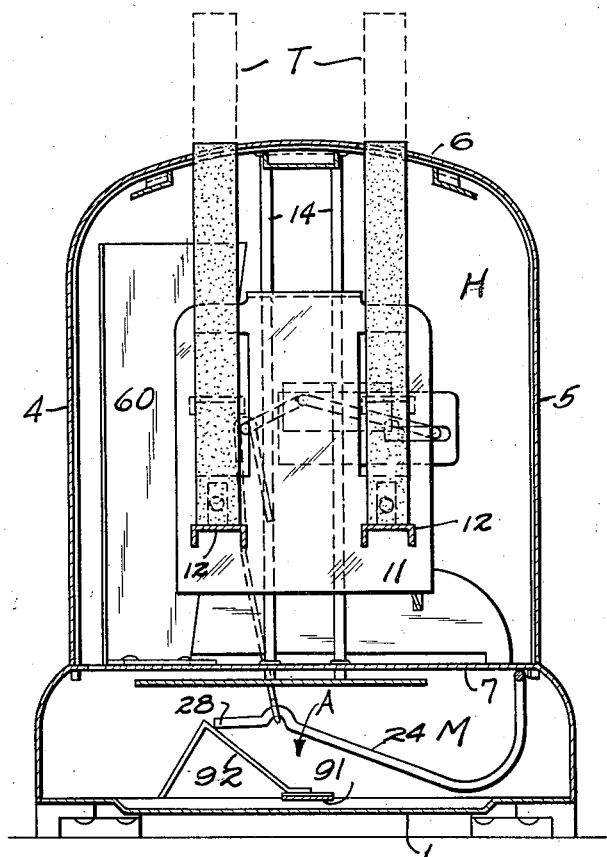
Figure 8 is a vertical transverse section corresponding to Figure 5 but showing the toast projecting parts in a different position.

A crank shaft 15 is journaled in a bracket 16 mounted on end wall 2 and includes a loop crank arm 17 and a single crank arm 18. The outturned end 19 of crank 18 is slidably received in a Z-shaped bracket 20 projecting from carrier plate 11. A handle 21 is fixed on the outer end of crank 15 and may be rotated manually to rotate the crank and thereby raise and lower the bread carrier from the lower position shown in Figure 8 to the upper position shown in Figures 4 and 5. A handle 22 corresponding in appearance to handle 21 is fixed to end wall 3. The toaster may be carried by handles 21 and 22 irrespective of the angular position of handle 21.

Figure 2:
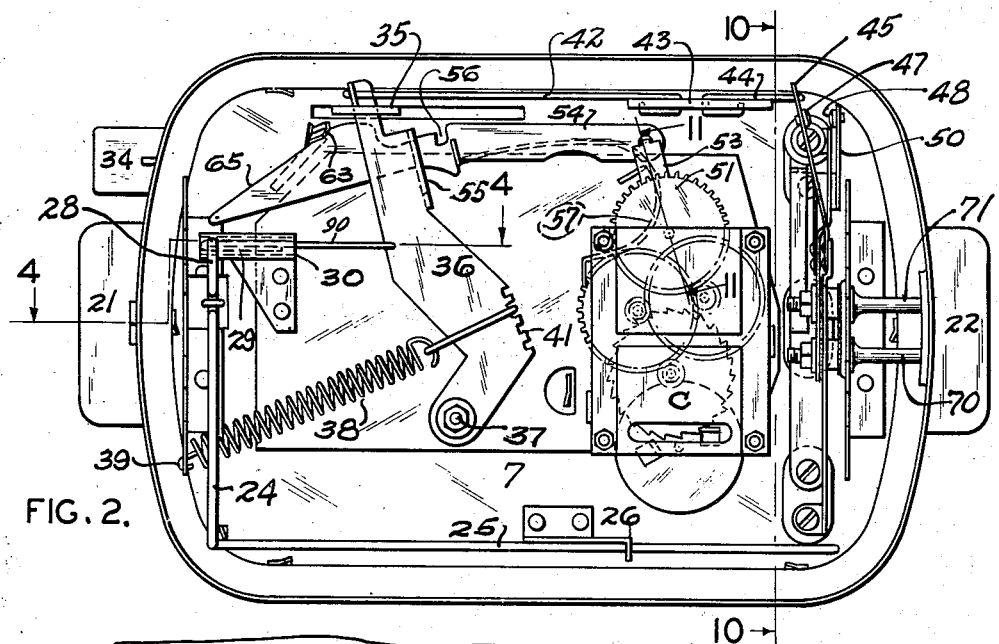
Figure 2 is a bottom view of the parts contained in the mechanism chamber, the bottom plate of the toaster being removed.
Figure 4:
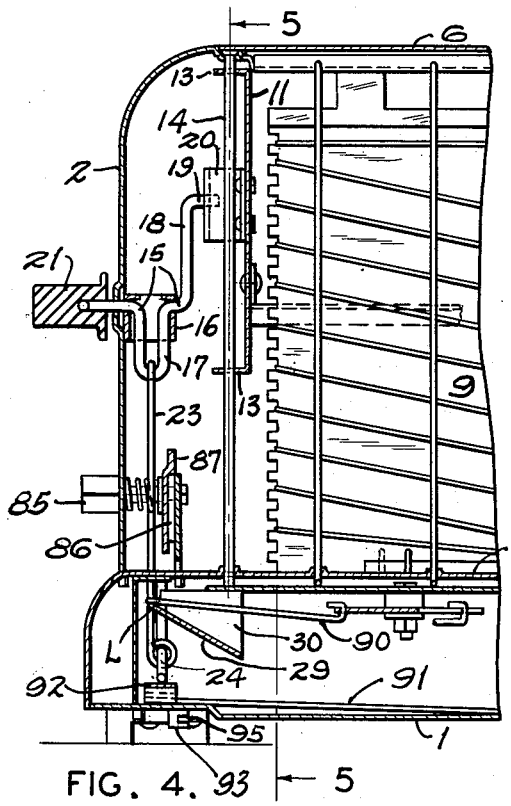
Figure 4 is a vertical longitudinal section through the control end of the toaster and is taken on the section line 4—4 of Figure 2.
Figure 5:
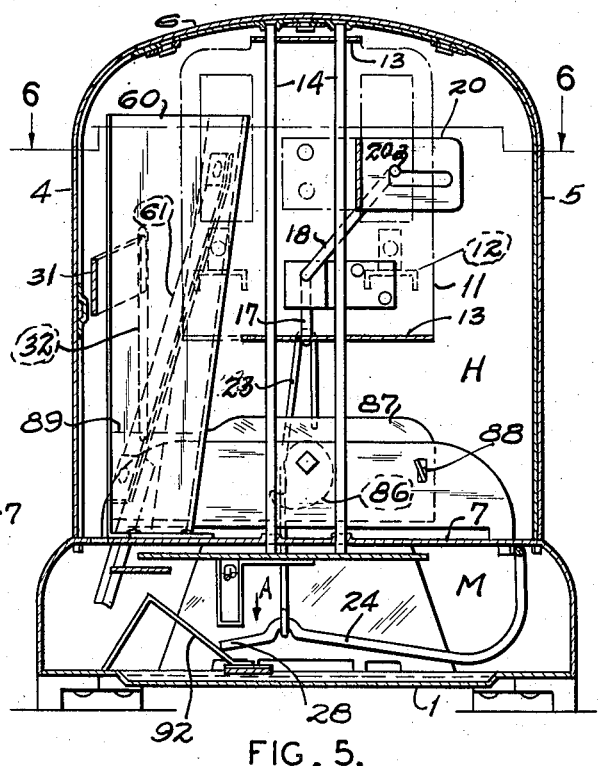
Figure 5 is a vertical transverse section taken on the section line 5—5 of Figure 4.
Figure 10:
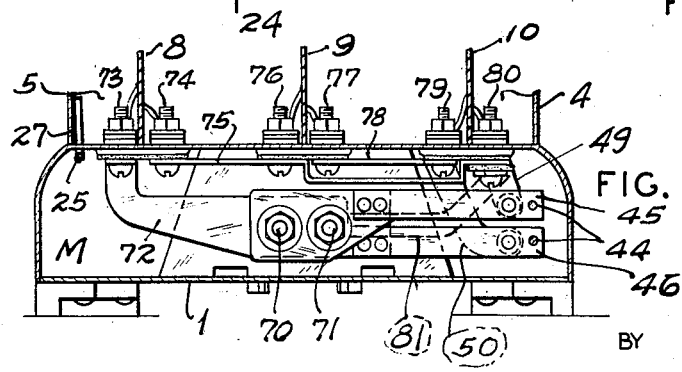
Figure 10 is a vertical transverse section through the terminal control end of the toaster and is taken on the line 10—10 of Figure 2.

A link 23 slidably engages the outer end of the loop crank arm 17 and extends downwardly through partition 7 into the mechanism chamber where it is connected to the outer end portion of the free leg 24 of a wire spring, the body 25 of which extends behind a holding lug 26, there being an anchoring leg 27 at the other end of the body extending up through partition 7, seated against the adjacent casing wall 5 (Fig. 10). Spring 24—25—27 is distorted to exert a thrust in the direction indicated by the arrow A (Figs. 5 and 8) and this thrust tends to pull link 23 downwardly rotating crank 15 to raise the outer end 19 of arm 18 and elevate the bread carrier (Figs. 4 and 5). When crank 15 is rotated manually by handle 21 the outer end 28 of arm 24 rides over the upwardly inclined bottom 29 of a pocket member 30 (Figs. 2 and 4) and upon passing the outer end of bottom 29 is caught upon the latch L and held temporarily against downward movement in the direction of the arrow A.

The elongated hook-like link 23 connecting crank 17 with spring arm 24 permits handle 21 to be rotated manually at any time to elevate the toast carrier without attending movement of arm 24.

The timing of the toasting operation is controlled by a combination of clockwork and a thermostat associated therewith. A bell crank is pivoted at 32 (Fig. 1) to a stationary bar 33. The horizontal leg 31 of the bell crank extends through end wall 2 and is provided with a button 34 for depressing the horizontal arm and thereby swinging the vertical arm 35 in an anti-clockwise direction. The lower end of arm 35 extends through partition plate 7 into the mechanism chamber and is connected to the outer end of a horizontal lever 36 (Fig. 2) pivoted at 37. A tension spring 38, anchored at 39, exerts a pull on lever 36 and the force of this pull may be varied by shifting the lever and spring connecting link 40 to different notches 41 in the lever.

A wire 42 has a lost motion connection to the outer end of lever 36 and to a strip of insulation 43, and two shorter wires 44 (Fig. 10) connect strip 43 with vertically spaced switch blades 45 and 46, each having an individual contact button 47 disposed to engage a corresponding stationary contact button 48 on arms 49 and 50 insulated from each other.

Figure 11:
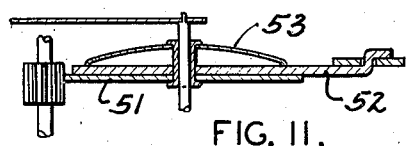
Figure 11 is a detail vertical section through the clockwork device and is taken on line 11—11 of Figure 2.

The arrangement for closing the switch and placing the timing mechanism in operating condition involves the use of a clockwork escapement mechanism indicated at C and including a driving gear 51 and an actuating arm 52 therefor held in frictional contact with the gear by a spring 53 (Fig. 11). Arm 52 is detachably connected to lever 36 by a bar link 54 which extends through a slot in an upstanding flange 55 on lever 36.

Figure 9:
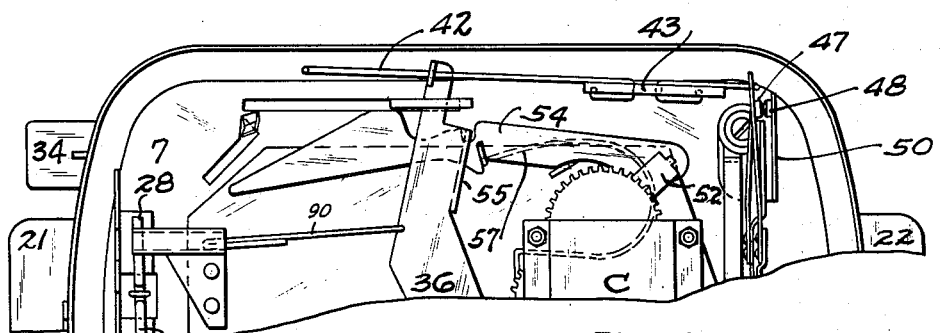
Figure 9 is a fragmentary bottom view corresponding to Figure 2 but showing the parts in a different position.

When bell crank arm 31 is depressed and bell crank arm 35 moves to the right (Figs. 1 and 2) the element of flange 55 which forms the outer end of the slot in the flange rides over the edge of link 54 and enters a notch 56 in the link which is thrust in a clockwise direction by spring 57. Further movement of lever 36 overcomes the friction of spring 53 and pushes clock arm 52 to the right and the parts take the position shown in Figure 9. Upon release of the manual pressure upon button 34, spring 38 acts to slowly return lever 36, link 54 and arm 52 to the original position shown in Figure 2, this movement being retarded by the clockwork escapement.

Figure 1:
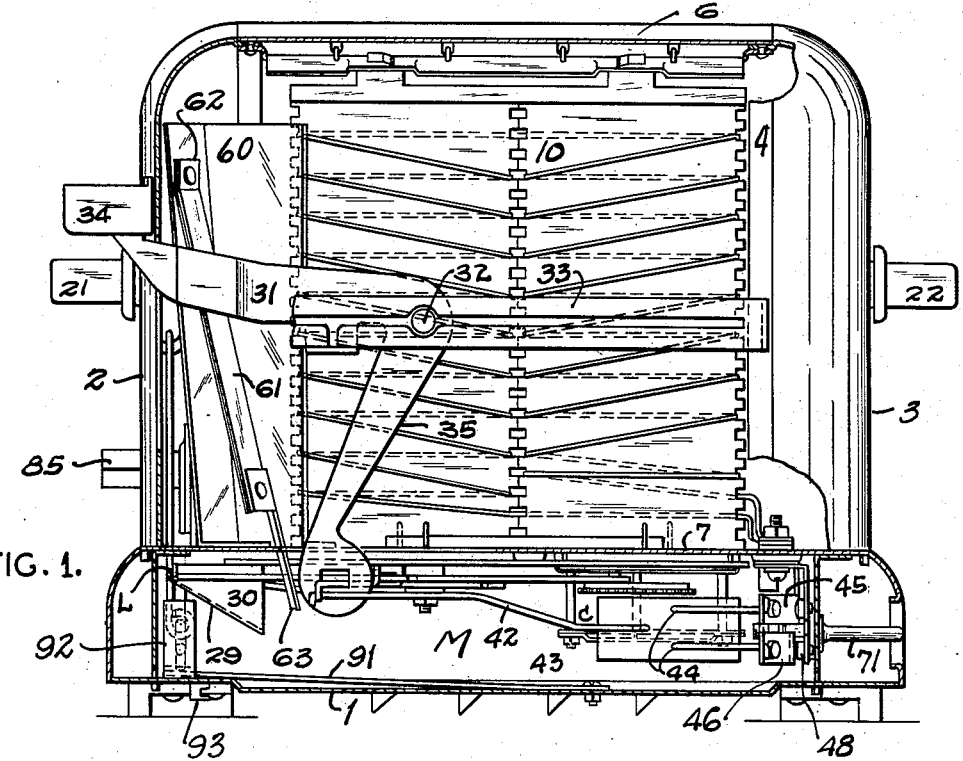
Figure 1 is a side view and a longitudinal section through the toaster.
Figure 6:
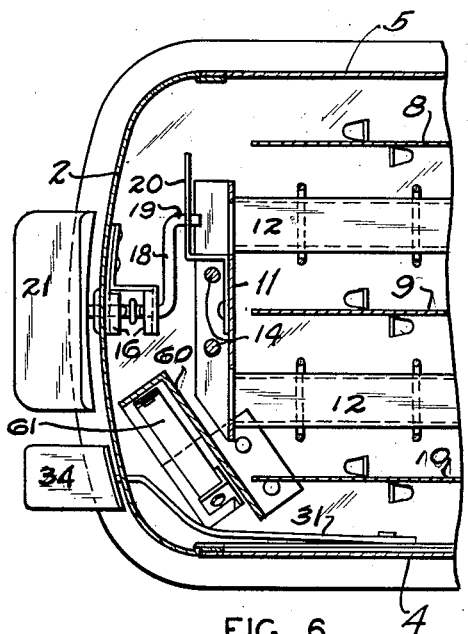
Figure 6 is a horizontal section taken on the section line 6—6 of Figure 5.

A support member 60 is mounted upon horizontal partition plate 7 near one end of the heating chamber and extends upwardly substantially throughout the heighth of the chamber and diagonally across one corner thereof (Figs. 1, 5 and 6).

A bi-metal thermostatic strip 61 is secured at its upper end 62 to the upper part of support member 60 and its free lower end carries a rigid finger 63 projecting downward through a slot 64 in plate 7 into the path of movement of the inclined edge 65 of the left hand end of link 54. As link 54 moves to the left its inclined edge 65 strikes finger 63 and the latter is pressed to the left until it engages the rear edge of slot 64, which edge consists of two elements 66 and 67 disposed at an obtuse angle to each other.

Figure 3:
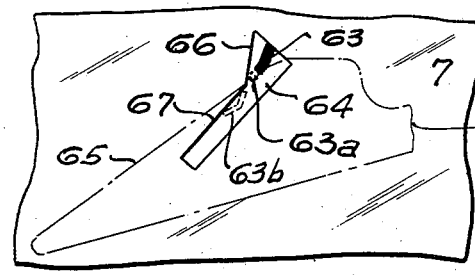
Figure 3 is a fragmentary bottom view showing some of the details apparent in Figure 2 but drawn to an enlarged scale and with the overlying part eliminated to more clearly illustrate the structure.

If the toaster is cold when the toasting operation is started, the cooking of the first piece of toast will be accompanied by a relatively slight heating up of support plate 60 and thermostat 61, nevertheless the latter will distort somewhat and move from the solid line position indicated at 63 to the adjacent dot-and-dash position indicated at 63a by the time the edge 65 of link 54 moves to the position indicated in Figure 3. Upon link edge 65 engaging finger 63 and moving it against slot edge 66 the latter will cam finger 63 back to the full line position indicated, thus affording link 54 greater travel and a corresponding extension of the toasting period as is required to cook the first slice of toast to the extent desired.

Upon the insertion of another piece of toast at a reasonably short period after the termination of the previous toasting operation, thermostat 61 will be warm enough to immediately move its finger to the dotted line position indicated at 63a and as the toasting operation continues the thermostat will reach a temperature substantially higher than that it reached in the first operation and will move over to the position indicated at 63b. As link 54 moves to the left its edge 65 will strike finger 63 substantially sooner than in the previous operation and the inclination of slot edge 67 is such that finger 63 will not be moved rearwardly but will immediately effect movement of link 54 to disengage flange 55 and free lever 36 and terminate the toasting operation. The length of subsequent toasting operations will be determined by the position of the thermostat finger which in turn will be determined by its initial temperature depending upon the length of time elapsing after the previous operation.

In all of these operations, fluctuation in the temperature of the thermostat is moderated by its mounting on support 60 and the positioning of the latter between thermostat 61 and the heating element 10, the relation of these parts being such that the thermostat is not heated so rapidly as would occur if it were alongside of the heating element or not shielded from the heat therefrom.

Preferably the toaster is of the "high and low heat" type in which two circuits are provided, three for cooking the bread and one for maintaining the toaster, and any toast therein, warm for an indefinite period after the toasting operation is completed.

Previous toasters of this general type have utilized a plurality of rotary switches for obtaining this result and reference is made to Patent 2,070,290 issued to the present applicant on February 9, 1937, and to Patent 2,112,422 issued to the present applicant, and another, on March 29, 1938, as illustrating and describing switch constructions of this type. One of the objects of the present invention is to simplify the construction by combining the heating elements 8, 9 and 10 and switch arms 49 and 50 and the input connections thereto, so that the need for such rotary switches may be avoided.

The terminals 70 and 71 are arranged for the usual cord socket member.

The current conducting parts between terminals 70 and 71 are arranged so that heaters 8, 9 and 10 are wired in series when contacts 47 and 48 are spaced apart, and are wired in parallel when contacts 47 and 48 engage. To this end the series circuit leads from terminal 70 through bar 72 (Fig. 10) post 73, heater 8, post 74, bar 75, post 76, heater 9, post 77, bar 78, post 79, heater 10, post 80, bar 81 to terminal 71. This circuit is indicated by following the letters a in Figure 12.

When buttons 47 and 48 engage, the heater circuits are in parallel and the circuit for heater 8 (as indicated by the letters b in Figure 12) will extend from terminal 70 through bar 72, post 73, heater 8, post 74, bar 75. The circuit for heater 9 (as indicated by letters c in Figure 12) will extend from terminal 70 through switch blade 46, arm 50, bar 78, post 77, heater 9, post 76, bar 75, arm 49, blade 45 and terminal 71. The circuit for heater 10 (as indicated by letters d in Figure 12) will extend from terminal 70 through blade 46, arm 50, post 79, heater 10, post 80, bar 81 to terminal 71.

Thus it will appear that the series circuit, or low heat circuit, extends from terminal 70 through all three heaters to terminal 71 without passing through any of the switch blades. The parallel circuit, or high heat circuit, for heater 8 passes through one switch blade and arm, the parallel circuit, or high heat circuit, for heater 10 passes through the other switch blade and arm, and the parallel or high heat circuit for heater 9 passes through both switch blades and their arms.

With this construction the usual rotary switch, and a substantial amount of wire therefor, is completely eliminated and the high and low heat control is obtained by the double blade switch corresponding generally to that previously used in addition to the rotary switch.

The toaster includes means for manually varying the toasting period to produce light, medium or dark toast. This adjustment comprises the button 85 projecting from the end of the casing and arranged to rotate a cam 86 (Figs. 4 and 5) which bears against the downwardly facing shoulder of a plate 87 pivoted at 88 and having an upwardly facing edge 89 projecting into the path of movement of bell crank arm 31 as indicated by the elongated slot 32. When cam 86 is in the position shown in Figure 5, plate 87 is in its lowermost position and the bell crank may be moved anti-clockwise to the maximum degree, moving clock arm 52 (Fig. 9) to its extreme right hand position and providing link 54 and its inclined edge 65 with maximum travel before contacting thermostat finger 63 and disengaging the switch control lever 36. By rotating cam 86 180° the high point of the cam will lift plate 87 and reduce the extent of the downward movement of bell crank arm 31.

Figure 7:
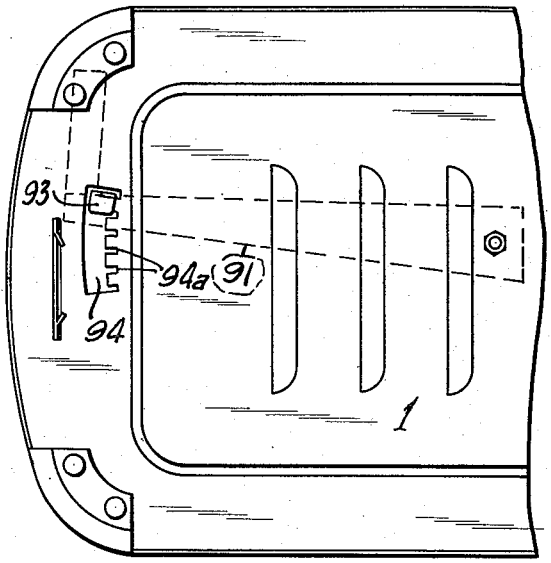
Figure 7 is a bottom view of the control end of the toaster showing the projector adjusting button as it appears to the user.

When lever 36 is freed from link 54 and moves to the left, it moves rod 90 (Figs. 2, 4 and 9) to the left and the outer end of this rod slides up the inclined bottom of pocket member 30 and pushes the end of spring arm 24 off of ledge L permitting the spring arm to move in a counter-clockwise direction and, through link 23 and crank 15, raise the toast carrier to project the upper end of the toast beyond the casing. The extent of this projection may be manually controlled by shifting lever 91 (Figs. 1, 4 and 7) and an inclined stop 92 carried on the outer end of the lever and movable transversely of the toaster bottom plate 1 as lever 91 is shifted. Obviously when stop 92 is in the position shown in Figure 5 the outer end 28 of arm 24 may approach the bottom plate of the toaster and this will mean the maximum upward movement of crank arm 18 and the bread carrier, permitting the toast slices to project to points indicated at dotted lines T in Figure 8. If the slide is moved to the position shown in Figure 8 it contacts with the end 28 of arm 24 when the latter is in its highest position and there will be no automatic elevation of the bread carrier when the toasting operation is finished. Intermediate adjustments of stop 92 will provide for upward projection of the toast accordingly. A button 93 depends from the outer end of lever 91 through a slot 94 in bottom plate 1 and the shank of the button is received in any one of the slots 94a extending at right angles to the length of slot 94. By pressing upwardly on button 93 a recess 95 on its inner face is alined with plate 1 and the button and lever may be moved to different adjustments in which it will be retained by the projection of its shank into the corresponding slot 94a when pressure on the button is released.

*Operation.*—To begin a toasting operation the user will rotate handle 21 to the horizontal position shown, elevating carrier 11—12 and in the uppermost position of the latter the terminal 19 on crank arm 18 slips into a notch 20a in plate 20 (Fig. 5) to hold the carrier elevated irrespective of the user's grip on handle 21. After the bread slices have been inserted through slots in the top of the housing and are resting on carrier arms 12, handle 21 may be readily rotated 90° to lower the carrier and the slices thereon to normal toasting position.

Button 34 is then depressed manually to the extent permitted by cam 86 and plate 87 and upon release of the pressure on button 34 spring 38 pulls lever 36 to the left, but very slowly due to the clockwork escapement mechanism.

When the connection between lever 36 and link 54 is broken by the engagement of cam 65 with thermostat finger 63, spring 38 pulls lever 36 instantly to separate contact buttons 47 and 48, thereby terminating the toasting operation. The general arrangement for setting the timing mechanism and for automatically opening the switch is substantially as described and claimed in the above mentioned Letters Patent 2,112,422. At the same time, spring arm 24 will be released from latch or detent L and the spring will rotate crank 15 to project the toast from the housing unless stop 92 is positioned to prevent such functioning of spring 24—25—27. At any time during the toasting operation, handle 21 may be rotated to raise the toast, for inspection, and then lower it, without affecting the automatic mechanism for timing and terminating the toasting operation.

The above description and accompanying drawings are illustrative only of a form of the invention which may be embodied in structure having substantially differently shaped and differently assembled parts. As previously indicated, some of the features, such as the heater control, may be embodied in other electrical equipment, waffle irons for example, and it is to be understood that the exclusive use of this and other modifications of the invention coming within the spirit of the claims is contemplated.

What is claimed is:

1. In a bread toaster, a housing inclosing a heating chamber, a slice carrier therein, a manually operative pivotally-mounted element positioned exteriorly of said housing, and connections between said element and carrier for raising said carrier by manual rotation of said member to a position in which the slice is projected from the housing to facilitate its removal with the human fingers or for lowering said carrier to a slice surrounding position for toasting, means automatically terminating the toasting operation, and a spring structure yieldingly supporting the carrier at a level between said positions, upon the functioning of said means and independently of manual manipulation of the pivotally mounted element, for projecting the slice a short distance from the housing to indicate that the toasting operation is completed.

2. In a bread toaster, a housing inclosing a heating chamber, transversely spaced upright rods therein near one end, a bread carrier including a part extending horizontally lengthwise of said chamber and also having an upright end member with vertically spaced bearings slidably engaging said rods to stabilize said carrier during vertical movement of the same on said rods, a manually rotatable element positioned exteriorly of said housing, a crank shaft movable by said element and having an offset arm adjacent said carrier end member, there being a horizontally disposed slot in said carrier end member receiving the other portion of said offset arm whereby said carrier may be raised by rotation of said element.

3. A toaster as described in claim 2 in which the arm receiving slot has an angularly disposed notch arranged to engage said arm when the carrier is in raised position and to hold it there independently of continued manual effort.

4. In a bread toaster, a housing inclosing a heating chamber for receiving a vertical slice of bread, a heater therein, a control switch for said heater, timing mechanism for operating said switch comprising a train of gears with escapement mechanism and elements for setting the same in action, said gears and elements being movable in a horizontal plane and being disposed beneath the bottom of said chamber, a bell crank pivoted on a horizontal axis on said housing and comprising a substantially horizontal leg and a substantially vertical leg, said horizontal leg being located a substantial distance above the bottom of said chamber and having a finger piece disposed to be moved by the user downwardly along the wall of the housing and said vertical leg extending downwardly through said bottom and having an operative connection to said gears and elements.

5. In a cooking structure, a heater, a member movable towards a position in which it affects the action of said heater, a timing mechanism, a connection between said mechanism and said member whereby said mechanism may move said member as described, thermostatically controlled means for breaking said connection at different points in the movement of said member, and a device automatically promptly moving said member to said position when said connection is broken.

6. In a cooking structure, an electric heater, a control switch therefor, a member movable to close and open said switch, a timing mechanism, a connection between said member and mechanism whereby said mechanism slowly moves said member towards switch opening position, a thermostat exposed to said heater and cooperating with said member to break said connection as said member moves towards said position, and means for promptly completing the movement of said member towards said position when said connection is broken.

7. In a cooker of the class described, an electrical heater, a control switch therefor, a lever movable to operate said switch to different positions, a spring secured to said lever and tending to move it and said switch to one position, timing mechanism restraining such movement of said lever and including a reciprocable bar having a notch, there being a lug on said lever seated in said notch when said lever and bar are moved to the other switch position, said bar having a cam surface disposed at an angle to the line of its reciprocation, and a thermostat movable, when heated, along said angle to oppose different portions of said cam surface and cooperate therewith to free said element from said notch.

8. In a bread toaster, a housing inclosing a heating chamber, a bread carrier therein, a crank shaft pivoted in said housing with an arm connected to said carrier, a spring connected to said crank shaft to rotate the same to raise said carrier, a detent restraining the action of said spring when said crank shaft is rotated manually to lower said carrier, and timing mechanism freeing said spring from said detent at the completion of a toasting operation, there being a lost motion connection between said crank shaft and spring whereby said element and crank shaft may be rotated manually to lift said carrier independently of said spring to permit inspection of the bread without interrupting the operation of said timing mechanism.

9. In a bread toaster, a housing inclosing a heating chamber, a bread carrier therein, a manually operable pivoted element positioned exteriorly of said housing, a crank shaft extending inwardly from said element and connected to said carrier to raise and lower the same and including a crank arm, a spring connected to said crank arm to rotate said shaft to carrier raising position, the direction of thrust of said spring against said arm being such that the leverage of said spring against said arm is shortened and its effective thrust is decreased as said carrier is lifted to raised position, a detent restraining the action of said spring when said element and crank shaft are rotated manually to lower said carrier, and timing mechanism freeing said spring from said detent at the completion of a toasting operation.

10. In a bread toaster, a housing with a base and a heating chamber above said base, a bread carrier in said chamber, a wire spring with an L-shaped body portion fulcrumed near its angle to said housing and with one leg anchored at its outer end to said housing and with the other leg operatively connected at its outer end to said carrier and, when free, tending to raise the latter, there being a detent for engaging said latter mentioned leg to hold it against carrier-raising movement, and means functioning at the end of a toasting operation to free said spring from said detent.

11. A structure as described in claim 10 in which the movement of the free leg of the spring over the detent is determined by the contour of the spring, and a lug engaging the anchored leg of said spring between its anchorage and the spring fulcrum and movable to vary the contour of the spring and the position of the free leg relative to said detent.

12. In a bread toaster, a housing inclosing a heating chamber, transversely spaced upright rods therein near one end, a bread carrier including a part extending horizontally lengthwise of said chamber and also having an upright end member with vertically spaced bearings slidably engaging said rods to stabilize said carrier during vertical movement of the same on said rods, a manually rotatable element positioned exteriorly of said housing, a shaft movable by said element and having a crank arm operatively connected to said carrier whereby said carrier may be raised by rotation of said element.

13. In a bread toaster, a toasting chamber, a heater control comprising a switch, a spring actuated member for opening said switch, and a clockwork timing device including an escapement mechansim, a connector between said mechanism and said member automatically engaging said member when said switch is closed, an element positioned in the path of movement of said connector for effecting disengagement of the same and said member as the latter moves under the thrust of said spring, and a thermostat in said chamber and movable throughout the toasting period to shift the position of said element and thereby vary the length of the toasting period.

14. A structure as described in claim 7 in which the switch control lever is provided with a series of engageable elements disposed lengthwise thereof and the lever moving spring is engaged with a selected one of said elements to vary the effective pull of the spring on the lever.

15. In a bread toaster, a housing inclosing a heating chamber, spaced upright rods therein adjacent to one end wall of the housing, a bread carrier extending lengthwise of said chamber and having an upstanding member at one end with horizontal flanges spaced apart vertically a substantial distance from each other and each flange being apertured to slidably receive both of said rods to stabilize said carrier against vertical and horizontal twisting, and means for raising and lowering said carrier on said rods including a manually-rotatable member on the exterior of said housing.

16. In a bread toaster, a heater, an electric circuit for said heater and including a switch, a spring connected to said switch to thrust it into open position, a clockwork timing mechanism, a disengageable connection between said mechanism and switch for holding the latter closed temporarily against the action of said spring, and a thermostat arranged to be heated by said heater and movable thereby to different positions during the toasting period and functioning in accordance with its position to disengage said connection whereby said spring may open said switch and terminate the toasting operation.

17. A structure as described in claim 10 which includes a stop with an inclined face movable across the path of the leg of the spring connected to the bread carrier and limiting its carrier raising movement, and means for releasably holding said inclined stop in adjusted position to vary its limitation on the movement of said spring arm.

18. In an electric toaster, a heating chamber, a mechanism compartment adjacent thereto, a wall between said chamber and compartment and provided with a slot, a thermostat in said heating chamber and including an element extending through said slot into said compartment and movable along said slot as said thermostat is heated, from a low temperature position to a high temperature position, timing mechanism in said compartment including a control member having a cam arranged to engage said element near the end of the toasting operation and to be moved thereby to terminate said operation, the portion of the side of said slot opposing said element when the thermostat is in low temperature position being arranged at an angle to the direction of thrust of said cam which permits said element to yield under said thrust, and the portion of the side of said slot opposing said element when the thermostat is in higher temperature position being arranged at an angle to back up said element against the thrust thereon by said cam, whereby said control member is cammed by said element to terminate the toasting operation.

19. In a bread toaster, a housing, a slice carrier therein, a device operating automatically to exert a thrust on said carrier tending to move the same to project a portion of a slice thereon beyond said housing when the toasting operation is completed, said device including a crank arm and a spring actuated member connected thereto, a stop engageable by said member to limit its movement and the slice projecting movement of said carrier, said stop being movable manually to different positions to engage the cooperating portion of said member to limit the movement of the latter.

20. In a bread toaster, a housing, a slice carrier therein, a device operating automatically to exert a thrust on said carrier tending to move the same to project a portion of a slice thereon beyond said housing when the toasting operation is completed, said device including an arm moved when said carrier is moved, and a stop engaged by said arm to limit movement of the latter and thereby limit the movement of said carrier, said stop being shiftable manually to different positions to engage said arm at different points and thereby control the positioning of the latter and said carrier under the thrust of said device.

21. In an electric toaster, a heater, a flexible thermostat subject to heat from said heater and having a part movable in one direction as the thermostat is heated, a backing element extending in said direction alongside of said part, a device for terminating the toasting period and including an actuating member with a cam face movable into engagement with said part to thrust it towards said element, said element having a portion substantially parallel and closely adjacent to the path of movement of said thermostat part as said thermostat is heated, and also having a portion spaced from said part when said thermostat is cool, whereby said thermostat, when cool, may be moved by said member and thereby prolong the toasting period, but when said thermostat is relatively hot, it will be held by said element against movement by said member and thereby cam the latter to terminate the toasting operation.

22. In an apparatus of the class described, a heater, a thermostat having a portion movable when the thermostat is heated, a timing mechanism, a part actuated thereby and having a cam-like element movable in a path towards said thermostat portion as time elapses and terminating the toasting operation when moved transversely of said path, said thermostat portion being movable transversely of the cam face of said element whereby said portion may be engaged by said element at varying time intervals according to the temperature of said thermostat and thereby tend to guide said element transversely of said path, said thermostat portion being inherently flexible under the thrust of said element, and means cooperating with said thermostat portion only after a substantial initial heating of the thermostat to form a backing for said portion to resist the thrust of said part in said path whereby further movement of said element by said mechanism will cause said element to move transversely of said path.

PAUL J. McCULLOUGH.